United States Patent [19]

Benson et al.

[11] 4,252,457
[45] Feb. 24, 1981

[54] OPTICAL FIBER-TO-METAL HERMETIC SEAL

[75] Inventors: Walter W. Benson, Berkeley Heights; Irfan Camlibel, Stirling; Donald R. Mackenzie, Plainfield; Theodore C. Rich, Berkeley Heights, all of N.J.

[73] Assignee: Bell Telephone Laboratories, Incorporated, Murray Hill, N.J.

[21] Appl. No.: 919,491

[22] Filed: Jun. 27, 1978

[51] Int. Cl.³ .......................... C03B 23/20; B25G 3/28
[52] U.S. Cl. ..................................... 403/284; 403/179
[58] Field of Search ................ 403/179, 284, 404; 65/DIG. 7

[56] References Cited

U.S. PATENT DOCUMENTS

| | | | |
|---|---|---|---|
| 1,727,895 | 9/1929 | Mraz | 403/284 |
| 3,281,174 | 10/1966 | Heil | 403/179 |
| 4,116,655 | 9/1978 | Lewis | 65/DIG. 7 |

*Primary Examiner*—Werner H. Schroeder

*Attorney, Agent, or Firm*—Michael J. Urbano

[57] ABSTRACT

A process for hermetically sealing an optical fiber to a metal housing is described. An optical fiber 12 is threaded through a thick-walled metal tube 10 which has a bore 11 of slightly larger diameter than the fiber. The tube and fiber are inserted in a pneumatically operated collet and uniform radial pressure is applied to the tube to form a unitary hermetic assembly. Metal tube 10 is characterized in that it has or, prior to forming the assembly, is annealed to have a Rockwell hardness of less that 15 T 15. At this value the metal is soft and the pressure required to cause the metal to cold flow around the fiber is less than that required to break the fiber. The tube is then soldered or otherwise secured in a hole in the housing, thus completing the hermetic seal. Such a seal is useful in hermetic packaging of optical devices. It is advantageous over the prior art for its simplicity and inexpensiveness. The technique is suited to high yield mass production of reliable seals.

9 Claims, 4 Drawing Figures

OPTICAL FIBER-TO-METAL HERMETIC SEAL

TECHNICAL FIELD

This invention broadly relates to forming glass-to-metal hermetic seals, and, more particularly, to hermetically sealing an optical fiber inside a metal tube which may subsequently be inserted into a hermetic housing for an optical device.

BACKGROUND OF THE INVENTION

Optical devices, such as junction lasers, photodiodes, or light emitting diodes, are sensitive to moisture and other atmospheric contaminants. In an optical communications system employing these devices as transmitters and receivers, a hermetic housing is generally provided for their protection. Inasmuch as optical signals exit or enter the housing via optical fibers, some means to hermetically seal the fiber to the housing is required. FIG. 4 is illustrative of a hermetic package where an optical fiber-to-metal seal is utilized.

However, joining two disparate materials such as metal and glass is a difficult task, particularly in view of the large discrepancy in their coefficients of thermal expansion. The difficulty is further complicated by the fact that the mechanical and optical properties of the optical fiber must not be significantly changed during construction of the seal. Consequently, the prior art has proposed various complicated processes for hermetically sealing an optical fiber to metal. Typically, a metallic coating is sputtered on the fiber before fusing with the metal. Another technique involves depositing a glass layer on the metal's surface where it will form a bond with metallic oxides. Then this glass layer is melted onto the fiber.

A less complicated technique, disclosed in copending patent application Ser. No. 667,961, filed for I. Camlibel et al on Mar. 18, 1976 and assigned to the assignee hereof, hermetically seals an optical fiber to a metal tube, by threading the fiber through the tube, filling the tube with molten solder, and allowing it to cool. The solder, upon solidifying, squeezes the fiber and forms a hermetic seal.

SUMMARY OF THE INVENTION

We have developed a simple technique for fabricating a reliable hermetic seal at room temperature. The method involves inserting an optical fiber through a metal tube and subjecting the metal tube to uniform radial compression sufficient to cause the tube to cold flow about the optical fiber, thereby forming a hermetic seal. A soft, malleable metal which has a Rockwell hardness of less than 15 T 15 and a surface relatively free of metallic oides will form a hermetic seal and will not damage the optical or mechanical properties of the fiber. In particular, copper, copper plated with gold, or aluminum which have been annealed to the appropriate hardness prior to forming the seal may be used. Despite the greatly differing thermal expansion coefficients between the metal and the glass, the seal remains hermetic at elevated temperatures.

Our invention, together with its various features and advantages, can be readily understood from the following more detailed description taken in conjunction with the accompanying drawings.

DETAILED DESCRIPTION

Figure 1:
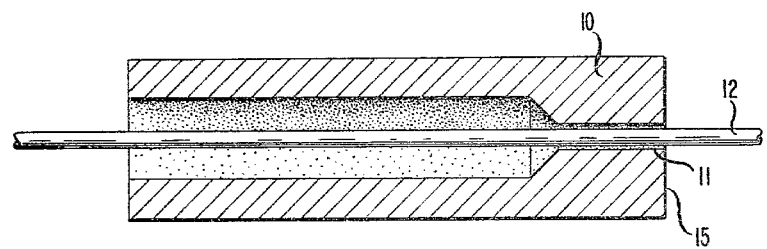
FIG. 1 is a cross-sectional view of the optical fiber-to-metal hermetic seal in accordance with one embodiment of our invention.

Turning now to FIG. 1, there are shown the basic components of an illustrative hermetic seal. A bare optical fiber 12 is threaded through a thick-walled metal tube 10. Tube 10 has a small diameter bore 11 at end 15. Bore 11 has a diameter chosen to be approximately 2 to 3 times the diameter of optical fiber 12. The hermetic seal is formed by compressing tube 10 onto fiber 12 by application of uniform radial compression to the circumference of tube 10 at end 15 where the smaller diameter bore 11 is located.

Tube 10 may be any soft, malleable metal which has or, prior to forming the seal, is annealed to have a Rockwell hardness of less than 15 T 15 (dead soft) as defined in *Machinery's Handbook*, "Testing the Hardness of Metal", Industrial Press Inc., New York, New York, 10016 (1968). Seals have been fabricated from commercial grade O.F.H.C. (oxygen free high conductivity) copper, aluminum, and gold plated copper. Other soft metals such as zinc, silver, or gold would also be appropriate providing that the tube can be soldered or otherwise hermetically secured to the metal housing of the package. The tube is first machined, cleaned, and then annealed in an inert, nonreducing atmosphere to obtain the desired softness. The metal softens with time and the requisite time depends on the temperature. Charts are available for determining the parameters for annealing a given metal to a certain hardness, such as *OFHC Brand Copper: A Survey of Properties and Applications*, AMAX Copper, Inc., 1973 on p. 21–23. The time and temperature ranges may be found experimentally by annealing a sample at a set temperature for a variable time and testing the hardness with a Rockwell superficial hardness tester, available from Wilson Mechanical Instruments, a division of American Chain and Cable Co., Bridgeport, Conn., until the time at which the desired hardness is obtained. As an alternative, temperature may be the variable.

Figure 2:
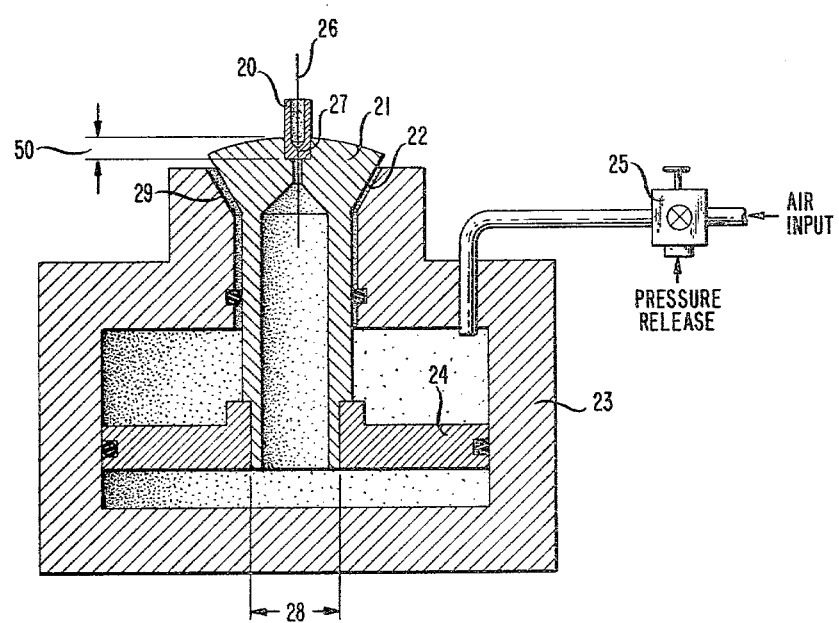
FIG. 2 is a cross-sectional view of a pneumatically operated collet chuck used to fabricate the hermetic seal of FIG. 1.

FIG. 2 illustrates one means for applying uniform radial compression to the tube and fiber of FIG. 1. FIG. 2 represents a pneumatically operated collet chuck. Optical fiber 26 is stripped of its protective plastic coating, cleaned, and inserted into tube 20. The end of tube 20 having the smaller diameter bore 27 is inserted into collet 21. Pressurized air is introduced into collet block 23 through three-way valve 25 forcing piston 24 down. As piston 24 moves downward, collet 21 is drawn into tapered guide 22 in the chuck. Collet 21 is thereby squeezed together exerting uniform radial compression on tube 20. The compression reduces both the outer diameter of tube 20 and the bore diameter. A hermetic seal is formed as the metal of tube 20 cold flows about fiber 26.

The pressure to be applied to the collet chuck in order to form a hermetic seal depends on the hardness of the metal, the length 50 of the end portion of the metal tube inserted in the collet, and the coefficient of friction between the collet and the collet chuck. Using a Dunham Standard 5c air collet chuck, 60 to 70 psi pressure applied to the piston exerts the requisite amount of pressure on a tube of 0.10 inch diameter inserted 0.10 inch into the collet. This translates into a force on the circumference of the tube of about 170,000 to 190,000 psi.

In order to calculate the amount of pressure to apply using another type of collet, the following relationships are helpful:

$$F = F_r/A_t \qquad (1)$$

$$F_r = FA_t \qquad (2)$$

where F=force on the circumference of the tube, $A_t$=area of the tube=length 50 times the tube diameter, and $F_r$=radial force=mechanical advantage of the wedge minus loss due to friction.

$$F_r = F_a \cot\theta - \alpha_f F_a \cot\theta \qquad (3)$$

$$F_a = F_r/[(1-\alpha_f)\cot\theta] \qquad (4)$$

Figure 3:
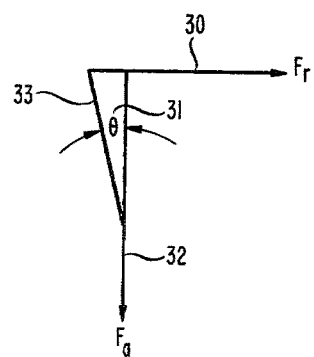
FIG. 3 represents a force diagram for calculating the radial force on the metal tube.

Referring to the force diagram of FIG. 3, $F_r$=radial force 30, $F_a$=axial force 32, and $\theta$=collet angle 31. Line 33 of FIG. 3 corresponds to line 29 of FIG. 2. $\alpha_f$=coefficient of friction between the collet and the collet chuck. For hardened steel to hardened steel, $\alpha_f$=0.03.

$$p = F_a/A_p \qquad (5)$$

Where p=air pressure applied to the piston and, referring to FIG. 2, $A_p$=active piston area=area of piston 24 minus collet area 28.

Since the hardness of the metal tube varies from batch to batch, the proper pressure per batch of seals is found by determining the minimum pressure at which a seal is formed and the maximum pressure that can be applied before the fiber is damaged and then selecting a pressure somewhere between the minimum and maximum. We have discovered that for unannealed copper, or other metals, the fiber will be damaged at approximately the same pressure as that at which a seal is formed. By annealing the copper to obtain a Rockwell hardness of less than 15 T 15 a difference of approximately 10 psi applied to the piston is found between the minimum and maximum pressures.

In the best mode contemplated by us, optical fiber-to-metal hermetic seals were fabricated from commercial grade O.F.H.C. copper which was machined to form a tube similar to tube 10 of FIG. 1 with the following tube dimensions: outer diameter—0.1 inch; diameter of bore 11—0.010 inch, length of tube 10—0.3 inch, length of bore 11—0.075 inch. After machining, the tube was cleaned in trichlorethylene, dried, and annealed for 4 hours at 700 degrees C. in a nitrogen atmosphere to achieve a Rockwell hardness of less than 15 T 15.

The protective coating was stripped from the end of a 0.004 inch diameter fused silica fiber and the fiber was cleaned in alcohol. The bare end of the fiber was threaded through tube 10 from the larger diameter bore end to end 15. End 15 was inserted 0.10 inch into a Dunham Standard 5C air collet chuck as shown in FIG. 2. Then 68 psi of pressurized air was introduced into the chuck exerting a force on the tube of about 174,800 psi.

It is to be noted that the pressure may vary from batch to batch as discussed above.

Gold plating is useful if copper ions can be detrimental to the optical device housed within the hermetic package. For example, copper contamination adversely affects the operation of a GaAs-AlGaAs double heterostructure junction laser. In such cases, the copper should first be machined to form the tube and then annealed to the appropriate Rockwell hardness before the gold is plated on. The presence of the gold film reduces the likelihood of copper contamination and also reduces the amount of pressure required to form a hermetic seal by about 15 percent.

It should also be noted that tubes fabricated from metals which oxidize rapidly, such as aluminum, should be sealed to the fiber promptly after annealing to avoid hardness caused by the oxide.

Various reliability tests were performed on hermetic seals fabricated according to the above-described method. The impact of the seal on the optical power transmitted through the fiber was determined by focussing a laser into one end of the fiber. The choice of proper pressure as described above gives about a 95 percent yield of seals having no reduction in power. A hermeticity test with a helium leak detector revealed a leak rate of less than $10^{-10}$ cc/sec., hermeticity being defined as a leak rate of less than $10^{-9}$ cc/sec. The seals remain intact and hermetic to temperatures in excess of 250 degrees C. despite the differing coefficients of thermal expansion between the fiber and the tube. The seals have also been subjected to environmental testing by temperature soaking at 370 degrees C. and cycling between 120 degrees C. and −40 degrees C. and have been found to remain hermetic for greater than 100 cycles. Pull tests were performed to determine the strength and in all cases the fiber was observed to break outside of the seal before it could be pulled out.

Figure 4:
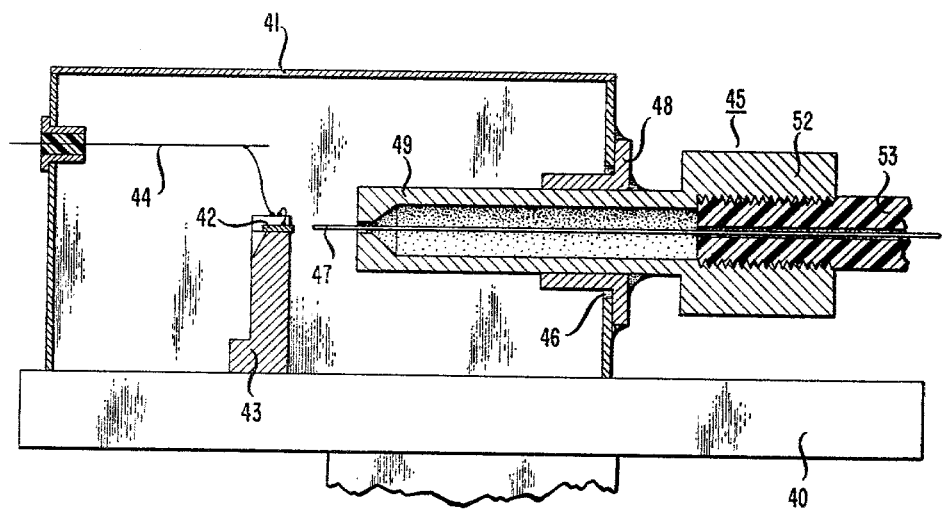
FIG. 4 illustrates use of the hermetic seal in a hermetic package.

FIG. 4 illustrates the use of the hermetic seal in hermetic packaging. The laser package of FIG. 4 basically comprises a header 40, a housing 41 mounted on the header, and inside the housing, an optical device 42 secured to mount 43, lead through conductor means 44, and an optical fiber-to-metal hermetic seal 45 mounted in an aperture 46 of the housing wall so that optical fiber 47 is aligned with the active area of device 42. Ferrule 48 covers the opening between tube 49 and the housing wall and is soldered to the housing wall and tube 49. Tube 49 has an internally threaded boss member 52 at its exterior end and a loose teflon jacket 53 of an optical fiber pigtail assembly is threaded into boss 52 to permit coupling and protect the fiber from stress where it is cantilevered beyond the seal. A more complete description of such a package may be found in copending patent application Serial No. 667,961, filed for I. Camlibel et al on Mar. 18, 1976 and assigned to the assignee hereof.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, these seals could be made at a higher temperature in a heated collet or the tube could have a bore of uniform diameter. Furthermore, seals have been fabricated on fibers up to 0.125 inches in diameter but the invention would be applicable to even larger diameter fibers.

We claim:

1. A method for fabricating a hermetic seal wherein a single optical fiber is inserted through a metal tube CHARACTERIZED BY subjecting said metal tube to uniform radial compression at room temperature sufficient to cause the metal of said tube to cold flow about said optical fiber thereby forming a hermetic cylindrical seal.

2. The method of claim 1 wherein said metal tube is annealed to a Rockwell hardness of less than 15 T 15 prior to said subjecting step.

3. The method of claim 1 wherein the amount of compression applied to said tube is between the amount that is sufficient to cause the metal to cold flow around the fiber and the amount that will cause the fiber to be damaged.

4. The method of claim 1 wherein uniform radial compression is applied by inserting an end of said tube into a collet chuck.

5. The method of claim 4 wherein for a 0.1 inch diameter tube inserted 0.1 inch into said collet, said tube comprising O.F.H.C. copper having a Rockwell hardness less than 15 T 15, a pressure in the range of 170,000 to 190,000 psi is applied to the circumference of said tube.

6. The method of claim 2 wherein prior to said subjecting step but subsequent to said annealing step, said tube is plated with a film of gold.

7. A hermetic seal of the type wherein a single optical fiber extends through the bore of a metal tube CHARACTERIZED IN THAT said metal tube is uniformly deformed about said optical fiber so as to form a hermetic cylindrical seal.

8. The hermetic seal of claim 7 wherein said metal tube has a Rockwell hardness of less than 15 T 15.

9. The hermetic seal of claim 8 wherein said metal is selected from the group consisting of copper, aluminum or gold plated copper.

* * * * *